United States Patent
Edwards et al.

(10) Patent No.: US 7,092,604 B2
(45) Date of Patent: Aug. 15, 2006

(54) OPTICAL TRANSCEIVER MODULE WITH IMPROVED DDIC AND METHODS OF USE

(76) Inventors: Phillip J. Edwards, 6721 Positano La., San Jose, CA (US) 95138; Charles Steven Joiner, 861 Cottonwood Dr., Cupertino, CA (US) 95014; Oliver W. Northrup, 1336 Gilmore St., Mountain View, CA (US) 94040

( * ) Notice: Subject to any disclaimer, the term of this patent is extended or adjusted under 35 U.S.C. 154(b) by 4 days.

(21) Appl. No.: 10/718,010

(22) Filed: Nov. 20, 2003

(65) Prior Publication Data

US 2005/0089329 A1    Apr. 28, 2005

Related U.S. Application Data

(60) Provisional application No. 60/427,918, filed on Nov. 20, 2002.

(51) Int. Cl.
*H04B 10/12* (2006.01)

(52) U.S. Cl. .................. 385/100; 398/136; 398/137

(58) Field of Classification Search ............ 385/92, 385/100; 398/17, 31, 128, 135, 137, 136; 359/152
See application file for complete search history.

(56) References Cited

U.S. PATENT DOCUMENTS

| | | | |
|---|---|---|---|
| 6,408,334 B1 * | 6/2002 | Bassman et al. | 709/223 |
| 6,850,319 B1 * | 2/2005 | Bisson et al. | 356/73.1 |
| 2003/0053170 A1 * | 3/2003 | Levinson et al. | 359/152 |
| 2003/0221491 A1 * | 12/2003 | Albert et al. | 73/724 |

FOREIGN PATENT DOCUMENTS

WO    WO 2004047151 A2 *  6/2004

\* cited by examiner

*Primary Examiner*—Frank G. Font
*Assistant Examiner*—Mary El-Shammaa
(74) *Attorney, Agent, or Firm*—Parsons & Goltry; Robert A. Parsons; Michael W. Goltry

(57) ABSTRACT

An optical transceiver module is disclosed with improved digital diagnostic integrated circuits. The optical transceiver includes an electrical-to-optical transmitter and an optical-to-electrical receiver each coupled to a digital diagnostic integrated circuit. A bi-directional 2-wire control interface is provided and a microcontroller couples the digital diagnostic integrated circuit to the control interface. Various methods are described for using the microcontroller to incorporate changes or diagnostic functions in the digital diagnostic integrated circuit.

6 Claims, 1 Drawing Sheet

OPTICAL TRANSCEIVER MODULE WITH IMPROVED DDIC AND METHODS OF USE

CROSS-REFERENCE TO RELATED APPLICATIONS

This application claims the benefit of U.S. Provisional Application No. 60/427,918, filed 20 Nov. 2002.

FIELD OF THE INVENTION

This invention relates generally to the field of optical modules. In particular, the present invention relates to improved digital diagnostic integrated circuits for use in optical transceiver modules.

BACKGROUND OF THE INVENTION

Fiber optics are increasingly used for transmitting voice and data signals. As a transmission medium, light provides a number of advantages over traditional electrical communication techniques. For example, light signals allow for extremely high transmission rates and very high bandwidth capabilities. Also, light signals, when transmitted by optical fibers, are resistant to electro-magnetic interferences that would otherwise interfere with electrical signals. Light, when transmitted by optical fibers, also provides a more secure signal because it doesn't allow portions of the signal to escape from the fiber optic cable as can occur with electrical signals in wire-based systems. Light also can be conducted over greater distances without the signal loss typically associated with electrical signals on copper wire.

While optical communications provide a number of advantages, the use of light as a transmission medium presents a number of implementation challenges. In particular, the data carried by light signal must be converted to an electrical format when received by a device, such as a network switch. Conversely, when data is transmitted to the optical network, it must be converted from an electronic signal to a light signal. A number of protocols define the conversion of electrical signals to optical signals and the transmission of those optical signals, including the ANSI Fiber Channel (FC) protocol and the SFF-8472 standard. The FC protocol is typically implemented using a transceiver module at both ends of a fiber optic cable. Each transceiver module typically contains a laser transmitter circuit capable of converting electrical signals to optical signals, and an optical receiver capable of converting received optical signals back into electrical signals. Typically, a transceiver module is electrically interfaced with a host device, such as a host computer, switching hub, network router, switch box, computer I/O and the like, via a compatible connection port.

A problem with these protocols is that they are often revised. As a result, it generally becomes necessary to upgrade the existing digital diagnostic integrated circuits within the fiber optic module each time the protocols are revised. Thus, it would be highly advantageous to provide a fiber optic transceiver module which can be easily upgraded with changes to the standard.

It would be highly advantageous, therefore, to remedy the foregoing and other deficiencies inherent in the prior art.

Accordingly, it is an object the present invention to provide new and improved optical transceiver modules.

Another object of the present invention is to provide new and improved optical transceiver modules with improved digital diagnostic integrated circuits.

Another object of the present invention is to provide new and improved optical transceiver modules that are easily upgraded with changes to the standard.

Another object of the present invention is to provide new and improved optical transceiver modules that improve the fabrication efficiency and manufacturing capabilities of optoelectronic modules.

A further object of the present invention is to provide new and improved methods of use of the optical transceiver modules.

SUMMARY OF THE INVENTION

Briefly, to achieve the desired objects of the instant invention in accordance with a preferred embodiment thereof, an optical transceiver module is disclosed with improved digital diagnostic integrated circuits. The optical transceiver includes an electrical-to-optical transmitter and an optical-to-electrical receiver each coupled to a digital diagnostic integrated circuit. A bi-directional 2-wire controls interface is provided and a microcontroller couples the digital diagnostic integrated circuit to the control interface. Various methods are described for using the microcontroller to incorporate changes or diagnostic functions in the digital diagnostic integrated circuit.

Desired objects of the instant invention are further realized in a method of controlling optical transceiver modules with improved digital diagnostic integrated circuits including the step of providing an optical transceiver module coupled to a digital diagnostic integrated circuit, an control interface, and a microcontroller coupling the digital diagnostic integrated circuit to the control interface. The method further includes the step of using the microcontroller to map addresses of IC's in the digital diagnostic integrated circuit for improved utilization of the IC's.

Desired objects of the instant invention are further realized in another method of controlling optical transceiver modules with improved digital diagnostic integrated circuits including the step of providing an optical transceiver module coupled to a digital diagnostic integrated circuit, a control interface, and a microcontroller coupling the digital diagnostic integrated circuit to the control interface. This method further includes the step of using the microcontroller to add diagnostic functions of the optical transceiver module and components in the optical transceiver module to the digital diagnostic integrated circuit. Some diagnostic functions that may be added include mapping registers in the digital diagnostic integrated circuit to different locations, adding flags, adding interrupt functions, and implementing password functions. Still another diagnostic function that may be added by the microcontroller includes modifying a register based interface to implement a command type interface.

BRIEF DESCRIPTION OF THE DRAWINGS

The foregoing and further and more specific objects and advantages of the instant invention will become readily apparent to those skilled in the art from the following detailed description of a preferred embodiment thereof taken in conjunction with the drawings, in which.

DETAILED DESCRIPTION OF THE DRAWINGS

Figure 1:
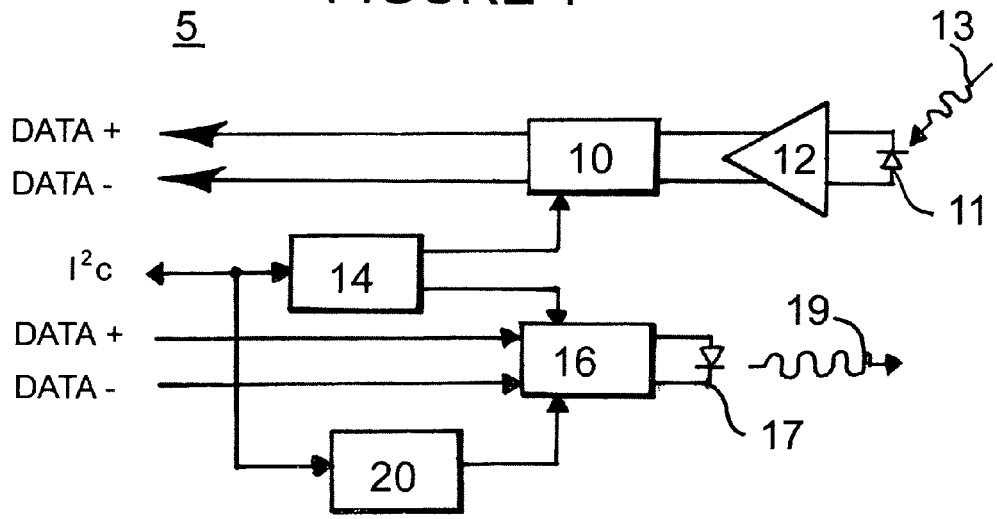
FIG. 1 is a simplified block diagram of an optical transceiver for a fiber optic module.

Turning now to FIG. 1, a simplified block diagram of an optical transceiver 5, illustrates functions typically performed in a fiber optic module. Transceiver 5 is provided for purposes of explanation of functions and not as a prior art device. It will be understood, however, that the functions of optical transceiver 5 can be performed in other types of optoelectronic modules wherein it is desired to convert an optical signal to an electrical signal or vice versa. The transceiver illustrated in FIG. 1 represents a standard small form factor 8472 (hereinafter referred to as "SFF-8472"), Revision 9.0 digital diagnostic solution. However, it will be understood that the illustration of SFF-8472 in this embodiment is for illustrative purposes only and that other standards could be used. These fiber optic modules are typically designed for single mode operation up to 2.5 Gbps. Further, these modules typically operate at a nominal wavelength of 1300 nm using a direct modulated Fabry Perot (FP) or Distributed Feedback (DFB) laser, depending on the implementation.

The SFF-8472 specification includes the ability for a transceiver to sense key power characteristics including average laser diode (transmit) current, and average modulated input and output optical power. Further, SFF-8472 compliant transceivers are capable of sensing both supply voltage and transceiver temperature, which is particularly important when systems are exposed to extreme environmental conditions.

In FIG. 1, transceiver 5 includes a preamplifier 12 that is electrically connected to a photodetector 11 which is capable of detecting incident light 13. Incident light 13 can be, for example, light generated from an optical fiber (not shown) or the like, wherein it is desired to convert light 13 into an electrical signal. Preamplifier 12 is electrically connected to a limiting amplifier 10 which behaves as a current limiter. Limiting amplifier 10 has outputs DATA$^+$ and DATA$^-$ which are capable of outputting electrical data signals to associated electronic circuitry (not shown). Similar electrical data signals are applied to inputs DATA$^+$ and DATA$^-$ of a laser driver 16 from the associated electronic circuitry. It will be understood that the electrical signals on inputs and outputs labeled DATA$^+$ and DATA$^-$ are the signals being communicated between separated destinations and while referred to herein as "data" may include any form of information that can be transmitted by light waves. Limiting amplifier 10 is electrically connected to a digital diagnostic integrated circuit (hereinafter referred to as "DDIC") 14 which can include, for example, a D51852 or D51858 integrated circuit chip. The operation of DDIC 14 will be discussed in more detail below.

DDIC 14 is electrically connected to a 2-wire control bus by way of a control interface, which will also be discussed in more detail below. Further, DDIC 14 is electrically connected to laser driver 16. Laser driver 16 is electrically connected to a light emitting device 17 which is capable of emitting light 19 to, for example, an optical fiber (not shown) or a similar optoelectronic element. Further, DDIC 14 is electrically connected to a digital potentiometer 20, by way of a control interface, and digital potentiometer 20 is also electrically connected to laser driver 16. However, it will be understood that digital potentiometer 20 is optional, but is included in this embodiment for illustrative purposes. As mentioned previously, laser driver 16 receives electrical data signals from the associated electronic circuitry on electrical inputs DATA$^+$ and DATA$^-$.

The control interface is capable of providing a communication path with optical amplifiers. The control interface was developed as a simple bi-directional 2-wire bus for efficient inter-IC control. At present, the control interface bus, for example, includes more than 150 CMOS and bipolar control interface bus compatible types for performing communication functions between intelligent control devices (e.g. microcontrollers), general-purpose circuits (e.g. LCD drivers, remote I/O ports, memories) and application-oriented circuits (e.g. digital tuning and signal processing circuits for radio and video systems). Control interface compatible devices usually incorporate an on-chip interface which allows them to communicate directly with each other via the control interface. This design concept substantially solves the many interfacing problems encountered when designing digital control circuits.

DDIC 14 provides optical transceiver 5 Enhanced Digital Diagnostics capability by using ICs (e.g. registers, control chips, optical monitoring chips, etc.) that enables end users to remotely monitor key module parameters to ensure system compatibility and operation within required operating ranges. Along with the standard module identification information, DDIC 14 allows Enhanced Diagnostics, which monitor parameters such as laser condition, optical power, internal temperature, and supply voltage. Data can be continually updated to provide users real-time updates of module condition and link stability. The optical monitoring chips included in DDIC 14 are designed to offer complete Enhanced Diagnostics capability over the standard Small Form Factor pluggable (hereinafter referred to as "SFP") electrical interface. The ICs' small size makes them ideal for very dense packaging applications such as those in SFP modules.

Further, digital diagnostic capabilities in each module offer the ability to identify each optical module on the system. For example, a chip that stores supplier information is capable of allowing customers and end users to identify the module supplier and confirm that it's a qualified source. In particular, company-specific information can be stored in registers that identify the company. Further, the registers can store product information so that users can query the device to make sure it's the right one for the intended application.

DDIC 14 can also feature enhanced diagnostics capabilities that allow users to check the performance of optical components. For example, there can be warning and alarm settings in the registers that automatically alert the end users if parameters go beyond a predetermined level. One such parameter is the laser bias current. If the laser bias current is exceedingly high, it may mean the laser is close to end-of-life. Another such parameter is the internal module temperature. If the internal module temperature is too high, then it may imply that the ambient temperature in the system has gone beyond specified limits. Still another parameter is the laser output power. If output power is too high, then it can indicate that laser safety compliance is at risk. Another parameter is the supply voltage level. If the supply voltage level is too low, then the module performance could become unreliable.

Figure 2:
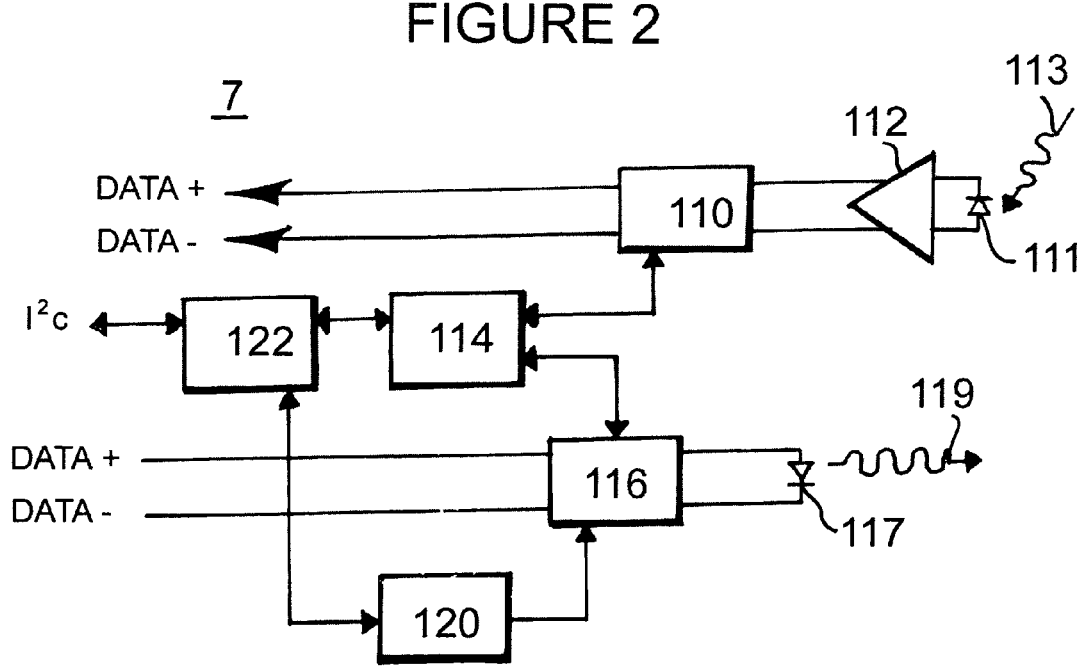
FIG. 2 is a simplified block diagram of a programmable optical transceiver for an optical module.

Turn now to FIG. 2 which illustrates a schematic of an improved optical transceiver 7 used to provide electronic control functions in a fiber optic module and to a digital diagnostic IC. Transceiver 7 illustrated in FIG. 2 is for a standard SFF-8472, Revision 9.0 digital diagnostic solution similar to that illustrated in FIG. 1 (i.e. optical transceiver 5). However, it will be understood that the illustration of this standard in this embodiment (i.e. optical transceiver 7) is for illustrative purposes only and that other standards could be used. It will be noted that in FIG. 2, components performing functions similar to those illustrated in FIG. 1 are labeled by adding a one to each element number.

In FIG. 2, a preamplifier 112 is electrically connected to a photodetector 111 which is capable of detecting incident light 113. Incident light 113 can be, for example, light generated from an optical fiber (not shown) or the like wherein it is desirable to convert light 113 into an electrical signal. Preamplifier 112 is electrically connected to a limiting amplifier 110 which behaves as a current limiter. Limiting amplifier 110 has outputs DATA+ and DATA− which are capable of outputting electrical data signals to associated electronic circuitry (not shown). Further, limiting amplifier 110 is electrically connected to a digital diagnostic integrated circuit (hereinafter referred to as "DDIC") 114 which can include, for example, a D51852 or D51858 integrated circuit chip.

DDIC 114 is electrically connected to a microcontroller 122 and to a laser driver 116. Laser driver 116 is electrically connected to a light emitting device 117 which is capable of emitting light 119 to, for example, an optical fiber (not shown) or a similar optoelectronic element. Microcontroller 122 is electrically connected to a control interface and to a digital potentiometer 120, which is also electrically connected to laser driver 116. Here it will be understood that microcontroller 122 may include, for example, any of the well known microprocessors or similar devices capable of storing programs, providing control signals, and being controlled with remotely generated control signals. Generally, digital potentiometer 120, or similar control device, is employed to control driving current to light emitting device 117, and preferably is used to ensure a constant drive over the life of light emitting device 117. It should be understood that digital potentiometer 120 is optional, but is included in this embodiment for illustrative purposes. Laser driver 116 is capable of receiving electrical data signals from the associated electronic circuitry on inputs DATA+ and DATA−. As stated above, it should be understood that the electrical signals on inputs and outputs labeled DATA+ and DATA− are the signals being communicated between separated destinations and while referred to herein as "data" may include any form of information that can be transmitted by light waves.

The use of microcontroller 122 within optical transceiver 7 allows the ability to fix changes of diagnostic IC compliance in two wire interface standards like SFF-8472. In particular, microcontroller 122 allows existing digital diagnostic IC's (e.g. those IC's included in DDIC 114) to effectively be upgraded to compliance due to revisions in the standard. For example, microcontroller 122 can be used to map the address of the control interface to better utilize the IC's in DDIC 114. Further, microcontroller 122 can be used to fix addressing requirement changes through updates to the standard without waiting for suitably fixed DDIC's.

In addition, microcontroller 122 can allow diagnostics functions pertinent to particular requirements. Further, microcontroller 122 can be used to interrupt the flow of data from the control interface to modify the behavior of transceiver 7 as measured from the control interface. Other uses of microcontroller 122 include, but are not limited to, using microcontroller 122 to map registers in diagnostic IC to effectively other locations, add flags and interrupt functions to transceiver 7, implement password functions, and/or modify the register based interface to implement a command type interface. Thus, microcontroller 122 allows optical transceiver 7 to operate independently to revisions in the standard.

Thus, new and improved optical modules are disclosed with improved digital diagnostic integrated circuits. The new and improved optical modules are easily upgraded with changes to the standard and substantially improve fabrication efficiency and manufacturing capabilities of optoelectronic modules. Further, new and improved uses of the new optical modules are disclosed.

Various changes and modifications to the embodiments herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is.

The invention claimed is:

1. An optoelectronic module with improved digital diagnostic integrated circuits comprising:
   an optical transceiver including an electrical-to-optical transmitter and an optical-to-electrical receiver each coupled to a digital diagnostic integrated circuit including a plurality of IC's designed to provide real-time updates of module condition and link stability;
   a control interface including a bi-directional 2-wire bus; and
   a microcontroller coupling the digital diagnostic integrated circuit to the control interface, the microcontroller being designed to map addresses of the IC's in the digital diagnostic integrated circuit for improved utilization of the IC's.

2. An optoelectronic module with improved digital diagnostic integrated circuits as claimed in claim 1 wherein the electrical-to-optical transmitter includes a light generating device coupled through a driver circuit to data input terminals, the driver circuit coupled to the digital diagnostic integrated circuit.

3. An optoelectronic module with improved digital diagnostic integrated circuits as claimed in claim 2 wherein the light generating device is a laser and the driver circuit is a laser driver.

4. An optoelectronic module with improved digital diagnostic integrated circuits as claimed in claim 3 further including a digital potentiometer having an output coupled to the laser driver and a control terminal coupled to the microcontroller.

5. An optoelectronic module with improved digital diagnostic integrated circuits as claimed in claim 1 wherein the electrical-to-optical receiver includes a photodetector coupled to a preamplifier, the preamplifier coupled through a limiting amplifier to data output terminals, the limiting amplifier coupled to the digital diagnostic integrated circuit.

6. An optoelectronic module with improved digital diagnostic integrated circuits as claimed in claim 1 wherein the control interface includes a bidirectional 2-wire bus for inter-IC control of the digital diagnostic integrated circuit.

* * * * *